(12) United States Patent
Kao et al.

(10) Patent No.: US 7,457,063 B2
(45) Date of Patent: Nov. 25, 2008

(54) COLOR WHEEL AND COLOR FILTER ASSEMBLY THEREOF

(75) Inventors: Po-sung Kao, Taichung (TW); Shou-chy Chia, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 238 days.

(21) Appl. No.: 11/353,891

(22) Filed: Feb. 14, 2006

(65) Prior Publication Data

US 2006/0132948 A1   Jun. 22, 2006

Related U.S. Application Data

(63) Continuation-in-part of application No. 10/790,924, filed on Mar. 1, 2004, now abandoned.

(51) Int. Cl.
  *G02B 5/22* (2006.01)
(52) U.S. Cl. ..................... 359/892; 359/889
(58) Field of Classification Search ............ 359/892, 359/889
  See application file for complete search history.

(56) References Cited

U.S. PATENT DOCUMENTS

| 5,777,694 A | 7/1998 | Poradish |
| 6,011,662 A | 1/2000 | Evans |
| 6,747,803 B2 * | 6/2004 | Hung .................. 359/634 |

FOREIGN PATENT DOCUMENTS

JP   2001023290 A   1/2001

* cited by examiner

*Primary Examiner*—Audrey Y Chang

(57) ABSTRACT

A color filter assembly rotates around a central axis thereof and includes a carrier defining a radially extending holes, a color filter fixed to the carrier, and a balancing element movably received and selectively positionable along each hole. Selectively positioning the balancing with respect to the central axis allows for statically balancing of mass and adjustment of the center of mass thereby enhancing rotation stability of the color filter assembly.

19 Claims, 3 Drawing Sheets

COLOR WHEEL AND COLOR FILTER ASSEMBLY THEREOF

CROSS-REFERENCE TO RELATED APPLICATIONS

This application is a Continuation in part of application Ser. No. 10/790,924 filed on Mar. 1, 2004 now abandoned.

BACKGROUND OF THE INVENTION

1. Field of the Invention

The present invention relates in general to a color wheel, and in particular to a color filter assembly having excellent balance and stability of rotation by adjustable and thus enhanced static mass balance.

2. Description of Related Art

Referring to FIGS. 1a and 1b of the attached drawings, a conventional color wheel comprises a carrier 11, a color filter 12, and a motor 2. The color filter 12 is fixed to the carrier 11 by adhesive 13, wherein the carrier 11 and the shaft 22 are connected and secured at the center of the motor 2 with a cover 21. The motor 2 rotates the carrier 11 and the color filter 12 around central axis 10 via the shaft 22.

As shown in FIG. 1b, the conventional color filter 12 has three filter segments 12a, 12b, and 12c. A recess 18 is formed on the carrier 11 to compensate unbalanced mass thereby providing stable rotation. It is difficult to precisely form the recess 18 however, and unbalanced mass distribution may occur, for example, due to flow of adhesive 13. Hence, stable and balanced rotation is difficult to achieve in the conventional color wheel.

Other prior arts are known. U.S. Pat. No. 6,011,662 disclosed a color wheel, comprising a plurality of color changing elements each fixed to a hub by pegs on opposite sides. The pegs, although changing the mass center of the color wheel, do not construct to enhance mass balance statically or dynamically, because the position of each peg is fixed on the color wheel, and is thus not adjustable.

U.S. Pat. No. 5,777,694 discloses a color wheel comprising a plurality of color filter segment fixed by a two-piece hub. The hub is made thicker at a middle portion and this makes the hub "mass-loaded" around a drive shaft for mass balance. However, no adjustability of the mass balance is provided in the known device, not to mention using position-adjustable elements to effect precisely mass balance.

JP Patent Document No. JP2001023290A discloses a turntable comprising a plurality of radially movable balls. When the turntable rotates, centrifugal forces move the balls with respect to the turntable to effect dynamic balance of mass. However, the balls do not provide static balance for their positions cannot be fixed with respect to the turntable.

Thus, the present invention is aimed to effect a precise static balance of mass for a color wheel in order to enhance rotation stability thereof.

SUMMARY OF THE INVENTION

Accordingly, an object of the present invention is to provide a color filter assembly. The color filter assembly rotates around a central axis thereof and comprises a carrier, a color filter, and a plurality of position-adjustable balancing elements. The carrier rotates around the central axis and has a plurality of holes. The color filter is fixed to the carrier and the balancing elements are movably and individually disposed in the holes and are thus position adjustable and independently fixed in the holes to set precisely the center of mass of the color filter assembly on the central axis.

Another object of the present invention is to provide a color filter assembly comprising a plurality of position-adjustable balancing element wherein the position of each balancing element with respect to a central axis of the color filter assembly is individually set to enhance static balance of mass of the color filter assembly.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1A:
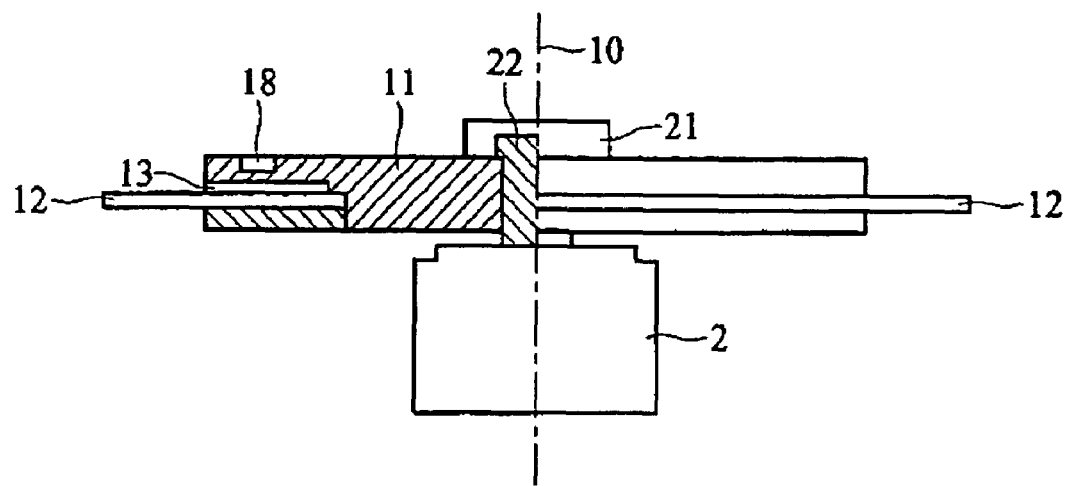
FIG. 1a is a side elevational view, partly sectioned, of a conventional color wheel.
Figure 1B:
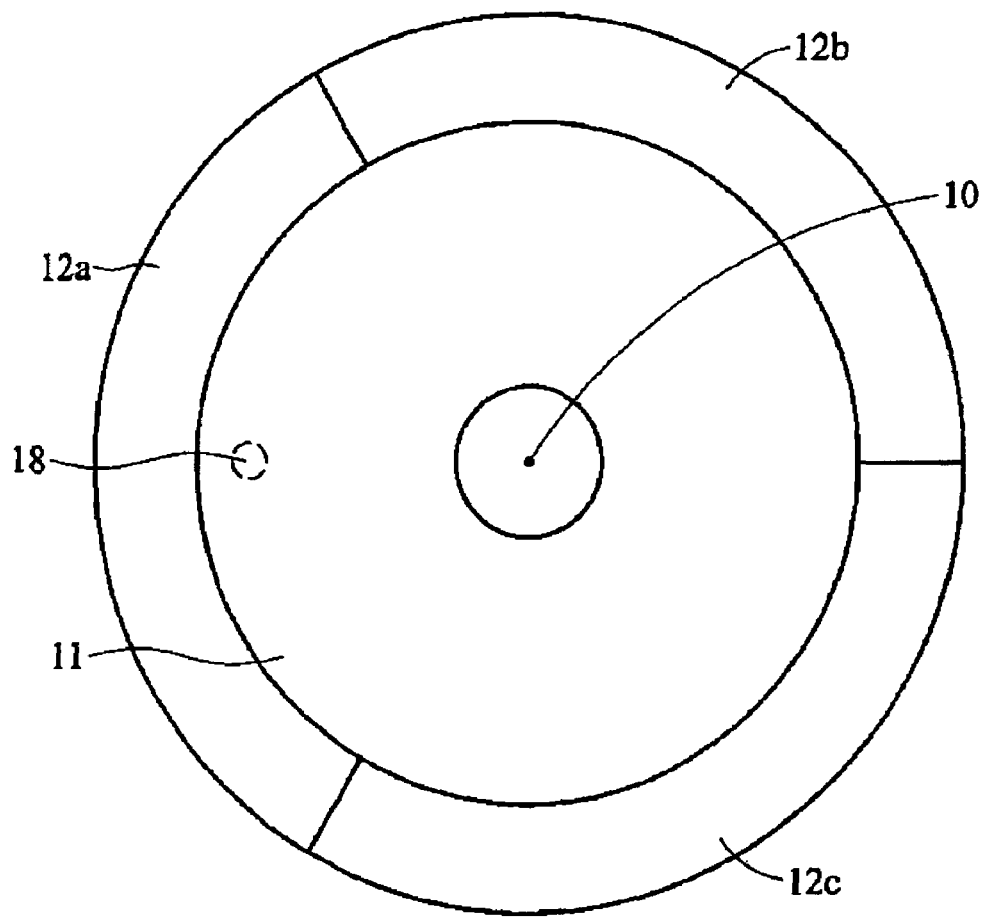
FIG. 1b is a top view of the conventional color wheel.
Figure 2:
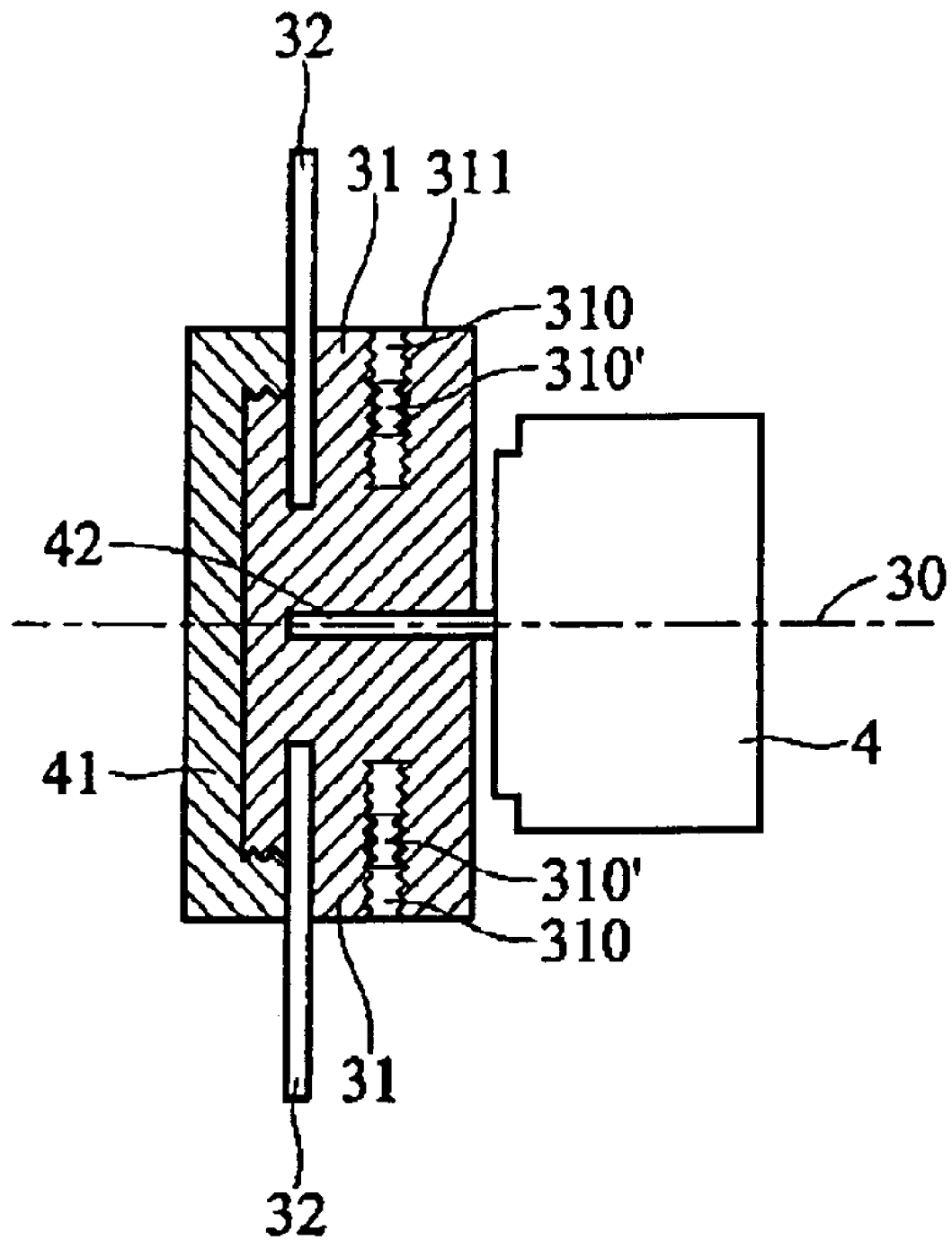
FIG. 2 is a cross-sectional view of a color wheel assembly constructed in accordance with a first embodiment of the present invention.
Figure 3:
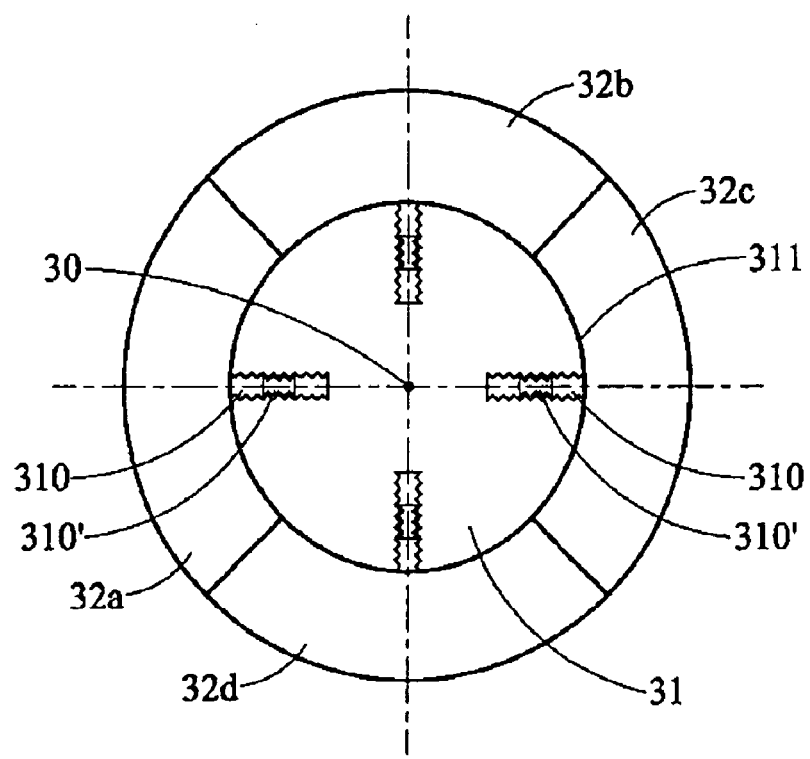
FIG. 3 is a top view of the color wheel assembly of the present invention.

With reference to the drawings and in particular to FIGS. 2 and 3, a color wheel constructed in accordance with the present invention comprises a color filter assembly having a carrier 31 and a color filter 32 fixed to the carrier 31. The carrier 31 has a central axis 30. A motor 4 has a shaft or spindle 42 to which the carrier 31 is concentrically coupled whereby the spindle 42 is coaxially coincident with the central axis 30. The motor 4 rotates the carrier 31 and the color filter 32 around the central axis 30 by the spindle 42. The carrier 31 and the color filter 32 are firmly connected by a securing member 41 that is fastened to the carrier 31 and abuts the color filter 32.

The carrier 31 has a plurality of holes 310 disposed on the lateral surface and radially extending with respect to the central axis 30. In the embodiment illustrated, the holes 310 are made parallel to the surface of color filter 32 and thus perpendicular to the central axis 30. A plurality of balancing elements 310' are movably disposed in the holes 310 whereby each balancing element 310' can be individually and selectively positioned along the associated radially extending hole 310. By individually setting the positions of the balancing elements 310', the location of the center of mass of the color filter assembly can be precisely adjusted. Preferably, the mass center of the color filter assembly is set on the central axis 30 to static mass balance and for improving rotational stability.

Referring to FIG. 3, the carrier 31 defines four radially extending holes 310, which evenly arranged on a circular peripheral surface of the carrier 31. Moreover, the holes 310 extend longitudinally toward and are symmetrical to the central axis 30. However, it is apparent that the holes 310 can be made in a non-evenly distributed manner and/or extending in an inclined and non-symmetric manner with respect to the central axis 30. The position adjustability of each balancing element 310' in each hole 310 allows for the adjustability of balance of mass about the central axis 30, which serves as a rotational axis of the color wheel. In addition, the center of mass of the color wheel can be set eccentric with respect to the central axis 30, if desired.

In the embodiment illustrated in FIG. 3, the color filter 32 comprises four filter segments 32a, 32b, 32c, and 32d, which are separately made and fixed to the carrier 31 by the securing member 41. However, the filter segments can also be integrally formed. To balance mass, each balancing element 310' can be adjusted and appropriately positioned in the hole 310 such that the center of mass of the color filter assembly locates on the central axis 30. If the center of mass locates at the left side with respect to the central axis 30, the balancing element 310' in the left hole 310 can be moved rightward (inward) such that the center of mass locates on the central axis 30 to improve stability and balance of rotation. Similarly, the balancing elements 310' in the upper and lower holes 310 can also be adjusted and appropriately positioned if the center of mass is at the upper or lower side. After appropriate positioning and adjustment, the balancing elements 310' are adhered to the carrier 31.

The balancing elements 310' and the holes 310 are correspondingly threaded for threading engagement with each other. This allows the balancing elements 310' to be readily moved inward or outward and arbitrarily positioned along the holes 310. Thus, the present invention achieves balanced mass through precise calibrating, and stability of rotation is improved thereby.

Figure 4:
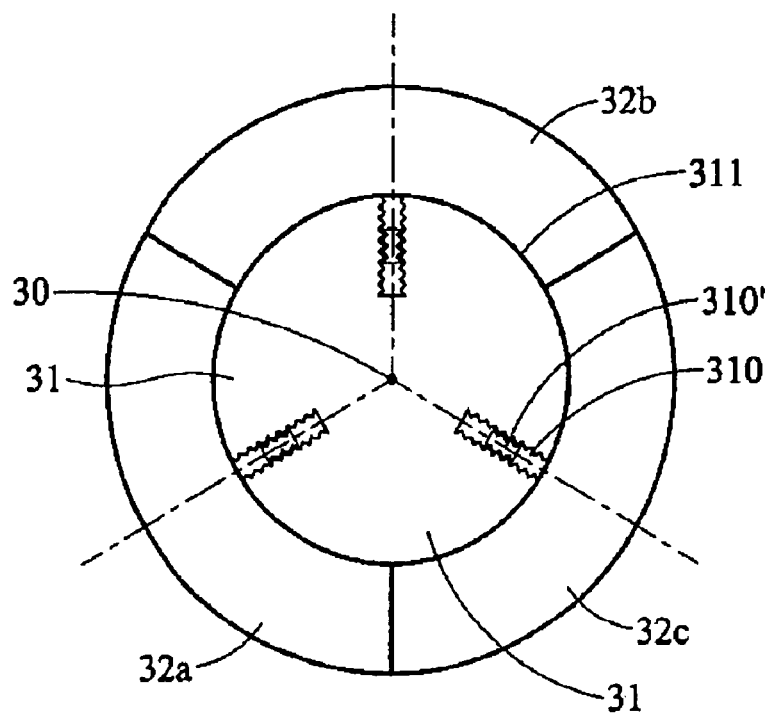
FIG. 4 is a top view of a color wheel assembly constructed in accordance with a second embodiment of the present invention.

It is apparent that the number of the balancing elements 310' and the radially extending holes 310 can be arbitrarily selected. For example and as shown in FIG. 4, the carrier 31 has three holes 310 evenly arranged on the circular peripheral surface thereof. The holes 310 extend longitudinally toward and are symmetrical to the central axis 30. Therefore, the balancing elements 310' can be adjusted and appropriately positioned in the holes 310 such that the center of mass of the color filter assembly locates on the central axis 30 to improve stability of rotation.

Further, if desired, each hole 310 can selectively receive one or more than one balancing element 310' for enhanced flexibility of adjustment of balance of mass.

In summary, the color wheel and the color filter assembly in accordance with the present invention can be applied to an optical device such as a DLP (Digital Light Processing) projector. A plurality of adjustable balancing elements 310' and corresponding holes 310 of the carrier 31 are provided such that the center of mass of the color filter assembly can be set at any desired location with respect to a geometrical central axis of the color wheel and static balance of mass of the color wheel can be readily effected through position adjustability of the elements 310' to thus enhance rotation stability of the color wheel. The present invention has a simple structure, is easy to calibrate, and as such improves rotational stability.

While the invention has been described by way of example and in terms of the preferred embodiments, it is to be understood that the invention is not limited to the disclosed embodiments. To the contrary, it is intended to cover various modifications and similar arrangements that are apparent to those skilled in the art. Therefore, the scope of the appended claims should be accorded the broadest interpretation to encompass all such modifications and similar arrangements.

What is claimed is:

1. A color filter assembly rotating around a central axis thereof, including:
   a carrier defining a plurality of holes and rotating around the central axis;
   a color filter fixed to the cater; and
   a plurality of balancing elements individually located and radially movable in the holes of the carrier so that the balancing elements adjust the center of mass of the color filter assembly to be on the central axis; wherein when the balancing elements are appropriately positioned, the balancing elements are fixed on the adjusted position to improve stability of rotation of the carrier.

2. The color filter assembly as claimed in claim 1, wherein the holes are formed parallel to the color filter and longitudinally toward the central axis.

3. The color filter assembly as claimed in claim 1, wherein the holes are symmetric to the central axis.

4. The color filter assembly as claimed in claim 1, wherein the holes are threaded for the balancing elements moving therein.

5. The color filter assembly as claimed in claim 1, wherein the balancing elements are adhered to the carrier when the center of mass of the filter assembly is on the central axis.

6. The color filter assembly as claimed in 1, wherein the position of each balancing element with respect to the central axis is individually and selectively adjusted and then fixed to effect static balance of mass of the color filter assembly and thus rotation stability of the carrier.

7. A color wheel, including:
   a filter assembly rotating around a central axis thereof, the filter assembly including a carrier having a plurality of holes and rotating around the central axis; a color filter fixed to the carrier; and a plurality of balancing elements individually located and radially movable in the holes of the carrier so that the balancing elements adjust the center of mass of the color filter assembly to be on the central axis; wherein when the balancing elements are appropriately positioned, the balancing elements are fixed on the adjusted position to improve stability of rotation of the carrier;
   a motor; and
   a shaft at the central axis connecting the motor and the filter assembly, wherein the motor rotates the filter assembly via the shaft.

8. The color wheel as claimed in 7, wherein the holes are formed parallel to the color filter and longitudinally toward the central axis.

9. The color wheel as claimed in 7, wherein the holes are symmetric to the central axis.

10. The color wheel as claimed in 7, wherein the holes are threaded for the balancing elements moving therein.

11. The color wheel as claimed in 7, wherein the balancing elements are adhered to the cater when the center of mass of the filter assembly is on the central axis.

12. The color wheel as claimed in 7, wherein the position of each balancing element with respect to the central axis is individually and selectively adjusted and then fixed to effect static balance of mass of the filter assembly and thus rotation stability of the carrier.

13. A color filter assembly comprising:
   a carrier rotatable about a central axis and defining a hole that is internally threaded;
   a color filter fixed to the carrier; and
   a balancing element movably received in the hole of the carrier, the balancing element forming external thread to threadingly engage the hole and thus selectively and removably positioning the balancing element along the hole to set location of mass center of the color filter assembly.

14. The color filter assembly as claimed in 13, wherein the carrier defines a plurality of holes, each movably receiving at least one balancing element therein, the balancing element being individually, selectively, and removably positioned along each hole to set the location of the mass center on the central axis.

15. The color filter assembly as claimed in 14, wherein the holes are symmetric to the central axis.

16. The color filter assembly as claimed in 14, wherein the holes are evenly arranged on a circular peripheral surface of the carrier.

17. A color filter assembly rotatable about an axis comprising:
- a carrier defining a plurality of holes;
- a color filter fixed to the cater, the cater and the color filter together having a first center of mass; and
- a plurality of elements movably received in and selectively and removably positioned along corresponding holes of the carrier to statically set a second center of mass for the color filter assembly, which is different from the first center of mass;

wherein each hole of the carrier is internally threaded to threadingly engage external thread of each element for selectively and removably positioning the element along the hole.

18. The color filter assembly as claimed in 17, wherein the second center of mass coincides with the axis of the color filter assembly.

19. The color filter assembly as claimed in 17, wherein each hole extends in a direction with respect to the axis to allow radial component of the movement of each element along the hole.

\* \* \* \* \*